US008544918B1

(12) United States Patent
Feringa

(10) Patent No.: US 8,544,918 B1
(45) Date of Patent: Oct. 1, 2013

(54) MAGNETIC RETRIEVAL ASSEMBLY

(76) Inventor: Steven J. Feringa, Zeeland, MI (US)

( * ) Notice: Subject to any disclaimer, the term of this patent is extended or adjusted under 35 U.S.C. 154(b) by 0 days.

(21) Appl. No.: 13/340,660

(22) Filed: Dec. 29, 2011

(51) Int. Cl.
*B25J 15/06* (2006.01)

(52) U.S. Cl.
USPC .......... 294/190

(58) Field of Classification Search
USPC ......... 294/65.5, 190, 209; 335/285, 289-294
See application file for complete search history.

(56) References Cited

U.S. PATENT DOCUMENTS

| | | | | | |
|---|---|---|---|---|---|
| 1,535,618 | A | | 4/1925 | Mayer | |
| 1,772,126 | A | | 8/1930 | Barry | |
| 2,628,122 | A | * | 2/1953 | Collins et al. | 294/65.5 |
| 3,789,336 | A | * | 1/1974 | Gordin | 335/285 |
| 3,924,115 | A | | 12/1975 | Hampton et al. | |
| 5,472,253 | A | * | 12/1995 | Resor | 294/65.5 |
| 5,647,623 | A | * | 7/1997 | Shiao | 294/65.5 |
| 5,799,999 | A | * | 9/1998 | Schneider et al. | 294/65.5 |
| 5,810,409 | A | * | 9/1998 | Hardie | 294/65.5 |
| D446,701 | S | | 8/2001 | Coleman, Jr. et al. | |
| 7,052,155 | B2 | | 5/2006 | Gavin et al. | |
| 2005/0200143 | A1 | | 9/2005 | Maestas | |
| 2006/0099883 | A1 | | 5/2006 | Cheung | |

* cited by examiner

*Primary Examiner* — Stephen Vu

(57) ABSTRACT

A magnetic retrieval assembly includes a handle. A tube has a first end and a second end and the first end of the tube is attached to the handle. A retrieving member has a retrieving end and a receiving end. The retrieving member has a cylindrical shape. The retrieving member is magnetized when subjected to an electric current. The receiving end is attached to the second end. An electro-magnetic field inducing circuit is mounted on the retrieving member and extends to the handle. The electro-magnetic field inducing circuit is actuated to magnetize the retrieving member. The retrieving member may be positioned near a metallic object and actuated to magnetically retrieve the metallic object and de-actuated to release the metallic object.

6 Claims, 4 Drawing Sheets

MAGNETIC RETRIEVAL ASSEMBLY

BACKGROUND OF THE DISCLOSURE

Field of the Disclosure

The disclosure relates to magnetic retrieval devices and more particularly pertains to a new magnetic retrieval device for magnetically retrieving metallic objects.

SUMMARY OF THE DISCLOSURE

An embodiment of the disclosure meets the needs presented above by generally comprising a handle. A tube has a first end and a second end and the first end of the tube is attached to the handle. A retrieving member has a retrieving end and a receiving end. The retrieving member has a cylindrical shape. The retrieving member is magnetized when subjected to an electric current. The receiving end is attached to the second end. An electro-magnetic field inducing circuit is mounted on the retrieving member and extends to the handle. The electro-magnetic field inducing circuit is actuated to magnetize the retrieving member. The retrieving member may be positioned near a metallic object and actuated to magnetically retrieve the metallic object and de-actuated to release the metallic object.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
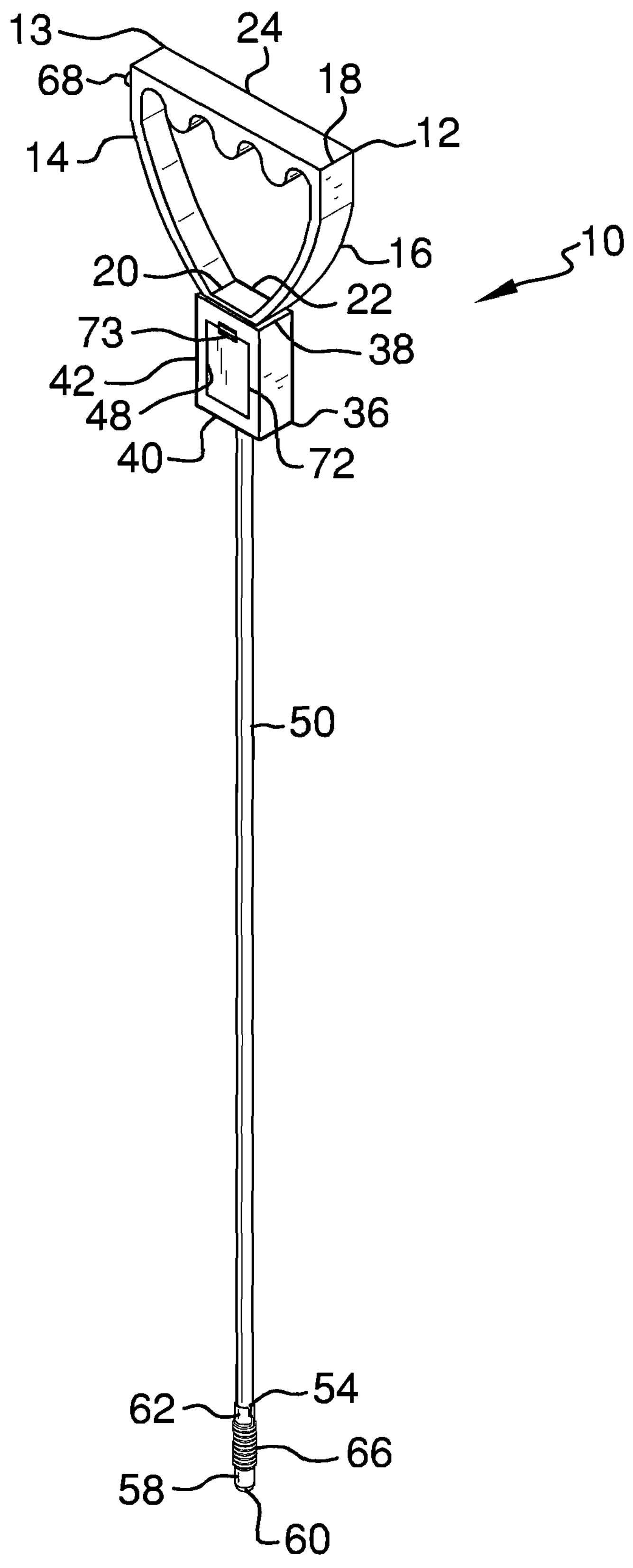
FIG. 1 is a left side perspective view of a magnetic retrieval assembly according to an embodiment of the disclosure.
Figure 2:
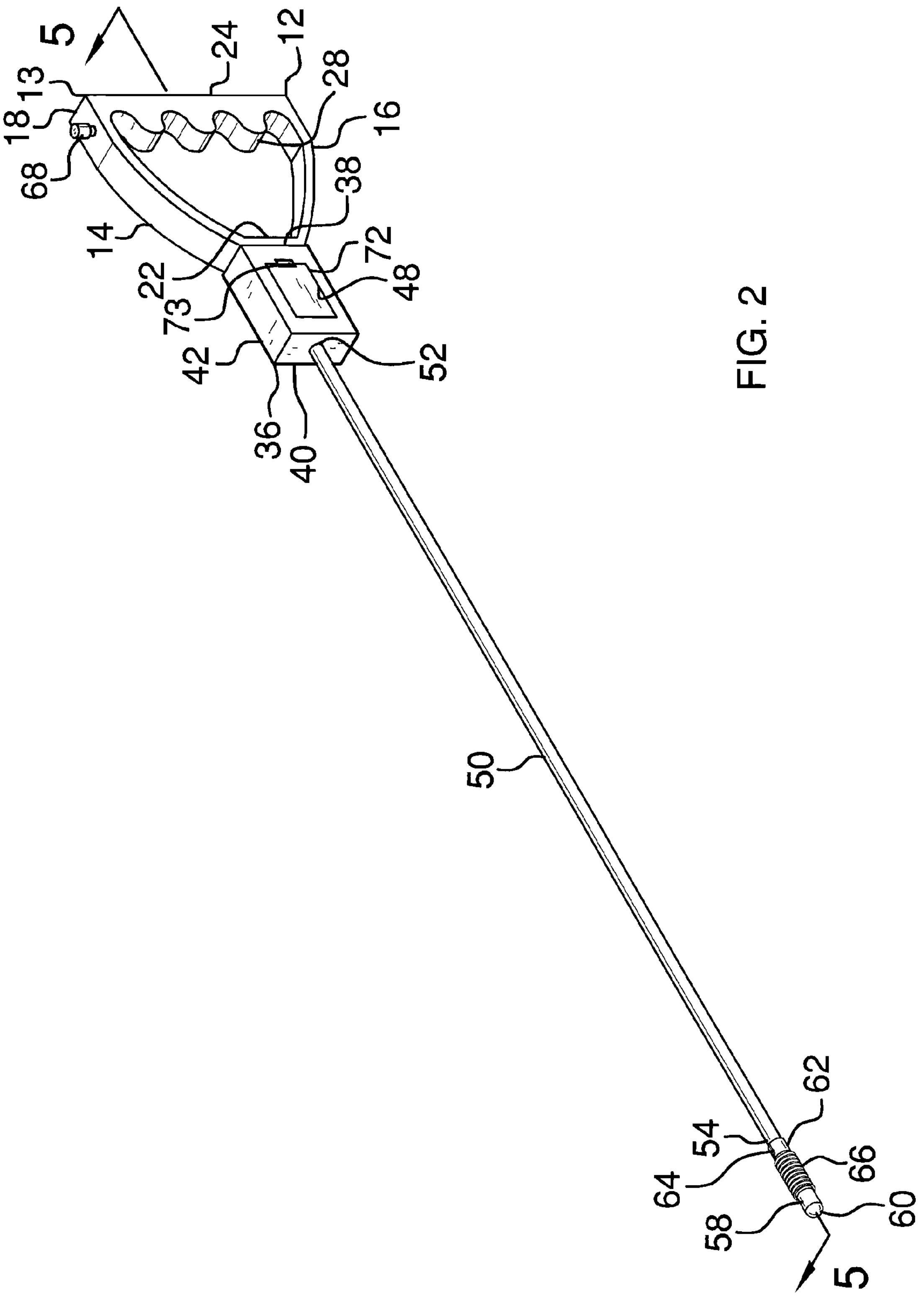
FIG. 2 is a right side perspective view of an embodiment of the disclosure.
Figure 3:
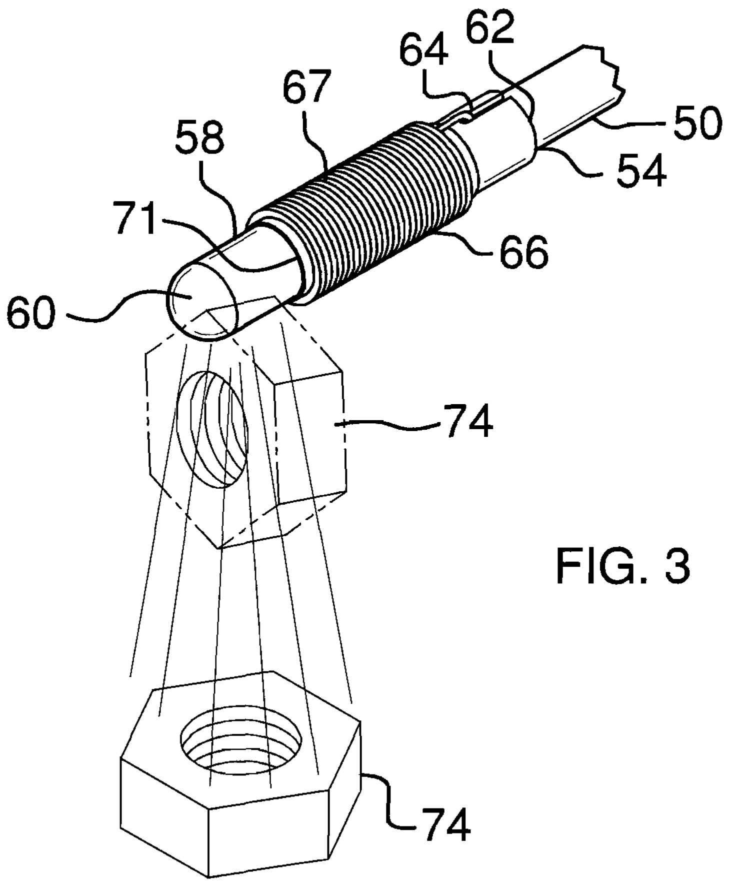
FIG. 3 is a bottom side perspective view of an embodiment of the disclosure.
Figure 4:
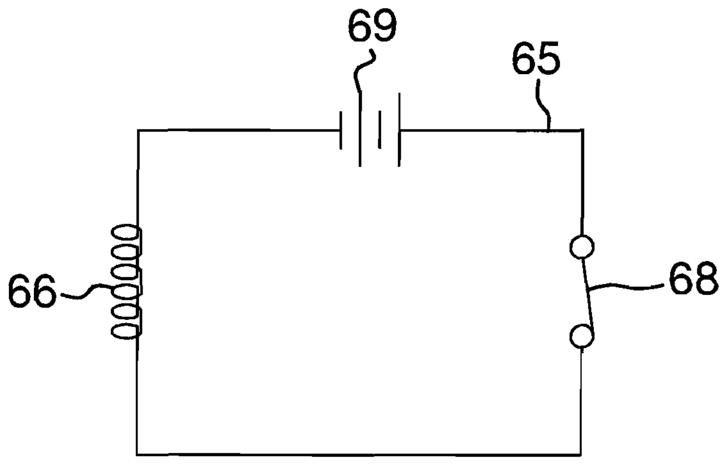
FIG. 4 is a schematic view of an embodiment of the disclosure.
Figure 5:
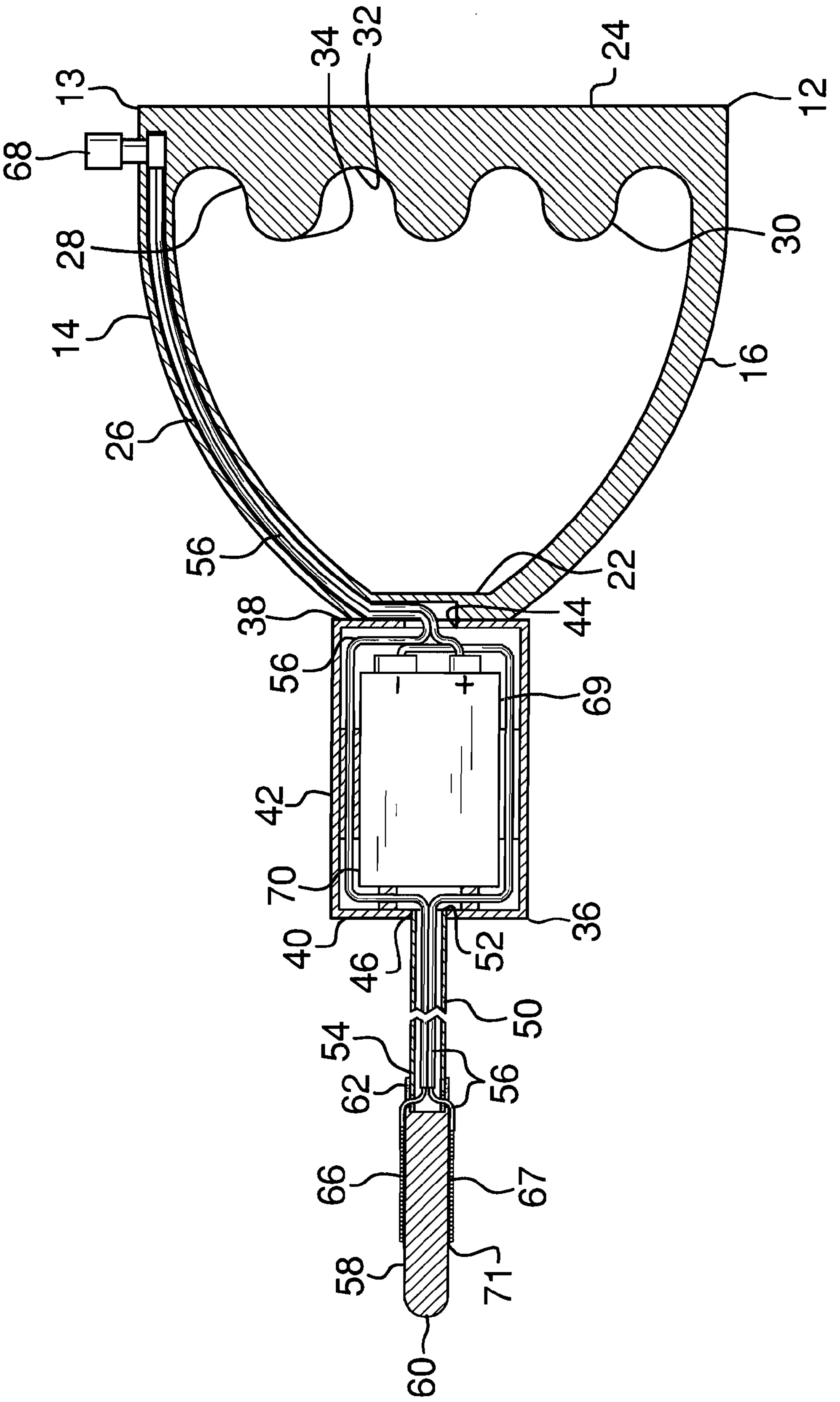
FIG. 5 is a cross sectional view taken along line 5-5 of FIG. 2 of an embodiment of the disclosure.

With reference now to the drawings, and in particular to FIG. 1 through 5 thereof, a new magnetic retrieval device embodying the principles and concepts of an embodiment of the disclosure and generally designated by the reference numeral 10 will be described.

As best illustrated in FIG. 1 through 5, the magnetic retrieval assembly 10 generally comprises a handle 12 including a closed loop 13. The handle 12 has a first arm 14 and a second arm 16 each including a top end 18 and a bottom end 20. A basal arm 22 extends between corresponding ones of the bottom ends 20 and a gripping arm 24 extends between corresponding ones of the top ends 18. A bottom side 28 of the gripping arm 24 comprises undulating curves 30 forming alternating curvilinear troughs 32 and crests 34. The troughs 32 may receive a person's fingers while gripping the handle 12 and may assist in holding the handle 12 in a horizontal position. The handle 12 may be comprised of a rigid material.

The handle 12 includes a conductor conduit 26 that is positioned within an interior of the first arm 14 and extends from the top end 18 of the first arm 14 to the basal arm 22. A housing 36 has a top wall 38, a bottom wall 40 and a perimeter wall 42 extending between the top 38 and bottom 40 walls. The top wall 38 is attached to the basal arm 22 and the top wall 38 has a conductor aperture 44 extending through the top wall 38 that is aligned with the conductor conduit 26. The bottom wall 40 has a tube aperture 46 extending therethrough. The perimeter wall 42 has an access aperture 48 extending therethrough to access an interior of the housing 36.

A tube 50 has a first end 52 and a second end 54. The tube 50 has a longitudinal axis extending from the first end 52 to the second end 54. The tube 50 is hollow and the first 52 and second 54 ends are open. The first end 52 extends through the tube aperture 46 and the tube 50 is attached to the housing 36. The tube 50 may have conductors 56 positioned in an interior of the tube 50. The conductors 56 may extend from the first end 52 to the second end 54. The tube 50 may be comprised of a non-magnetic material that may also be a rigid material. The tube 50 may have a length between 16.0 inches and 24.0 inches.

A retrieving member 58 has a retrieving end 60 and a receiving end 62. The retrieving member 58 may have a cylindrical shape and the retrieving member 58 is configured of a material that is magnetized when subjected to a proximate electric current. The receiving end 60 is attached to the second end 54. The receiving end 60 may have grooves 64 that extend toward the retrieving end 60 and the conductors 56 may exit the second end 54 and extend outwardly from the grooves 64.

An electro-magnetic field inducing circuit 65 includes a coil 66 that is positioned around the retrieving member 58. The coil 66 may comprise helical winding 67. The coil 66 extends downwardly from the receiving end 62 and towards the retrieving end 60. The coil 66 may be comprised of an electrically conductive material. The coil 66 may be connected to the conductors 56 extending outwardly from the grooves 64.

An actuator 68 is attached to the first arm 14 and is in electrical communication with the coil 66. The actuator 68 may be connected to conductors 56 that extend downwardly through the conductor conduit 26 and the conductors 56 may enter the housing 36 by passing through the conductor aperture 57. The actuator 68 may be selectively actuated in a first position to pass an electrical current through the coil 66 such that the coil 66 induces a magnetic field in the retrieving member 58. The actuator 68 may be selectively actuated in a second position to remove the electrical current from the coil 66 to eliminate the magnetic field in the retrieving member 58.

A power supply 69 is positioned within the interior of the housing 36 and is in electrical communication with the actuator 68 and the coil 66. The power supply 69 may comprise at least one battery 70. The power supply 69 may be connected to the conductors 56 that are connected to the actuator 68 and may also be connected to the conductors 56 in the interior of the tube 50.

An adhesive panel 71 may be positioned between the coil 66 and the retrieving member 58. The adhesive panel 71 may be comprised of an electrically insulating material and may prevent the coil 66 from passing electrical current through the retrieving member 58. A cover 72 is positioned over the access aperture 48 to close the access aperture 48. The cover 72 may have a tab 73 to engage the perimeter wall 42 to retain the cover 72 over the access aperture 48.

The retrieving member 58 may be positioned near a metallic object 74 that has been dropped into a hard to reach area. The coil 66 may be selectively actuated to magnetically retrieve the metallic object 74. The coil 66 may be selectively de-actuated to release the metallic object 74.

In use, the user may grip the handle 12 and direct the retrieving member 58 toward a metallic object. The actuator 68 may be actuated in the first position to pass an electrical current through the coil 66 and induce a magnetic field in the retrieving member 58 to magnetically retrieve the metallic object 74. The actuator 68 may be actuated in the second position to cease the electrical current passing through the coil 66 and eliminate the magnetic field in the retrieving member 58 to release the metallic object 74.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A magnetic retrieval assembly configured for magnetically retrieving metallic objects, said assembly comprising:

a handle;

a tube having a first end and a second end, said first end of said tube being attached to said handle;

a retrieving member having a retrieving end and a receiving end, said retrieving member having a cylindrical shape, said retrieving member being magnetized when subjected to an electric current, said receiving end being attached to said second end;

an electro-magnetic field inducing circuit being mounted on said retrieving member and extending to said handle, said electro-magnetic field inducing circuit being actuated to magnetize said retrieving member;

wherein said retrieving member is configured to be positioned near a metallic object and actuated to magnetically retrieve the metallic object and de-actuated to release the metallic object; and wherein said handle comprises a closed loop, said handle having a first arm and a second arm each including a top end and a bottom end, a basal arm extending between each of said bottom ends and a gripping arm extending between each of said top ends.

2. The assembly according to claim 1, wherein said tube has a length between 16 inches and 24 inches.

3. The assembly according to claim 1, wherein a bottom side of said gripping arm comprising undulating curves forming alternating curvilinear troughs and crests, said troughs being configured to receive a person's fingers.

4. The assembly according to claim 1, further including:

said handle including a conductor conduit being positioned within an interior of said first arm and extending from said top end of said first arm to said basal arm;

a housing having a top wall, a bottom wall and a perimeter wall extending between said top and bottom walls, said top wall being attached to said basal arm, said top wall having a conductor aperture extending through said top wall being aligned with said conductor conduit, said bottom wall having a tube aperture extending therethrough, said perimeter wall having an access aperture extending therethrough to access an interior of said housing;

said tube being hollow and having said first and second ends being open, said first end extending through said tube aperture and having said tube being attached to said housing, said tube being comprised of a non-magnetic material;

said electro-magnetic field inducing circuit including;

a coil being positioned around said retrieving member, said coil extending downwardly from said receiving end and towards said retrieving end, said coil being comprised of an electrically conductive material;

an actuator being attached to said first arm and being in electrical communication with said coil, said actuator being selectively actuated in a first position to pass an electrical current through said coil such that said coil induces a magnetic field in said retrieving member, said actuator being selectively actuated in a second position to remove the electrical current from said coil to eliminate the magnetic field in said retrieving member; and a power supply being positioned within the interior of said housing and being in electrical communication with said actuator and said coil, said power supply comprising a battery.

5. The assembly according to claim 1, said electro-magnetic field inducing circuit including:

a coil being positioned around said retrieving member, said coil being comprised of an electrically conductive material;

an actuator being attached to said handle and being in electrical communication with said coil, said actuator being selectively actuated in a first position to pass an electrical current through said coil such that said coil induces a magnetic field in said retrieving member, said actuator being selectively actuated in a second position to remove the electrical current from said coil to eliminate the magnetic field in said retrieving member; and a power supply being in electrical communication with said actuator and said coil.

6. A magnetic retrieval assembly configured for magnetically retrieving metallic objects, said assembly comprising:

a handle comprising a closed loop, said handle having a first arm and a second arm each including a top end and a bottom end, a basal arm extending between each of said bottom ends and a gripping arm extending between each of said top ends, said handle including a conductor conduit being positioned within an interior of said first arm and extending from said top end of said first arm to said basal arm, a bottom side of said gripping arm comprising undulating curves forming alternating curvilinear troughs and crests, said troughs being configured to receive a person's fingers;

a housing having a top wall, a bottom wall and a perimeter wall extending between said top and bottom walls, said top wall being attached to said basal arm, said top wall having a conductor aperture extending through said top wall being aligned with said conductor conduit, said bottom wall having a tube aperture extending therethrough, said perimeter wall having an access aperture extending therethrough to access an interior of said housing;

a tube having a first end and a second end, said tube having a longitudinal axis extending from said first end to said second end, said tube being hollow and having said first and second ends being open, said first end extending through said tube aperture and having said tube being attached to said housing, said tube being comprised of a non-magnetic material, said non-magnetic material being a rigid material, said tube having a length between 16 inches and 24 inches;

a retrieving member having a retrieving end and a receiving end, said retrieving member having a cylindrical shape, said retrieving member being magnetized when subjected to an electric current, said receiving end being attached to said second end;

an electro-magnetic field inducing circuit including;

a coil being positioned around said retrieving member, said coil extending downwardly from said receiving end and towards said retrieving end, said coil being comprised of an electrically conductive material;

an actuator being attached to said first arm and being in electrical communication with said coil, said actuator being selectively actuated in a first position to pass an electrical current through said coil such that said coil induces a magnetic field in said retrieving member, said actuator being selectively actuated in a second position to remove the electrical current from said coil to eliminate the magnetic field in said retrieving member;

a power supply being positioned within the interior of said housing and being in electrical communication with said actuator and said coil, said power supply comprising a battery;

a cover being positioned over said access aperture to close said access aperture; and wherein said retrieving member is configured to be positioned near a metallic object, whereupon said coil is configured to be selectively actuated to magnetically retrieve the metallic object and selectively de-actuated to release the metallic object.

* * * * *